United States Patent [19]

Kayukawa et al.

[11] 4,218,629
[45] Aug. 19, 1980

[54] MHD POWER GENERATOR

[75] Inventors: Naoyuki Kayukawa; Yasutomo Ozawa, both of Sapporo, Japan

[73] Assignee: The President of Hokkaido University, Sapporo, Japan

[21] Appl. No.: 923,497

[22] Filed: Jul. 11, 1978

[30] Foreign Application Priority Data

Jul. 28, 1977 [JP] Japan .................................. 52/89730

[51] Int. Cl.² .............................................. H02N 4/02
[52] U.S. Cl. ................................................... 310/11
[58] Field of Search .......................................... 310/11

[56] References Cited

U.S. PATENT DOCUMENTS

| | | | |
|---|---|---|---|
| 3,147,711 | 9/1964 | Blake | 310/11 X |
| 3,274,408 | 9/1966 | Louis | 310/11 |
| 3,319,091 | 5/1967 | Burhorn et al. | 310/11 |
| 3,358,163 | 12/1967 | Hofmann et al. | 310/11 |

Primary Examiner—Donovan F. Duggan
Attorney, Agent, or Firm—Frishauf, Holtz, Goodman & Woodward

[57] ABSTRACT

An MHD power generator includes a pair of electrode units between which a plasma stream flows from a plasma stream generating source. Each electrode unit comprises a plurality of segmented electrodes connected with each other with an insulating material disposed between the next adjacent segmented electrodes. The segmented electrode is made of magnetic material such as iron and cooled by an electrode cooling device. A pair of electrically insulating plates are mounted i.e. one on the upper surface of the electrode units and the other on the lower surface of the electrode units to define a plasma passage. A plurality of lead wires are each connected to a corresponding segmented electrode so as to take out an electric power which is generated in the plasma passage.

15 Claims, 17 Drawing Figures

F I G. 4 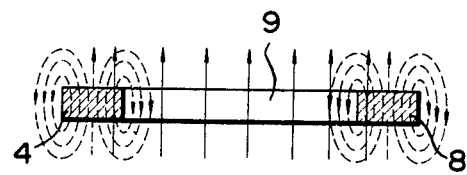
F I G. 5 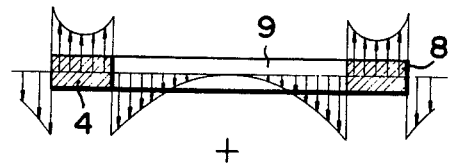
F I G. 6 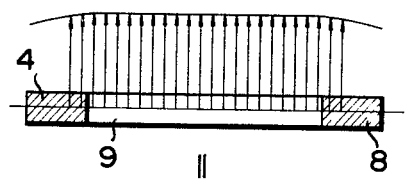
F I G. 7 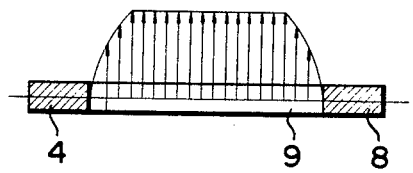
F I G. 8 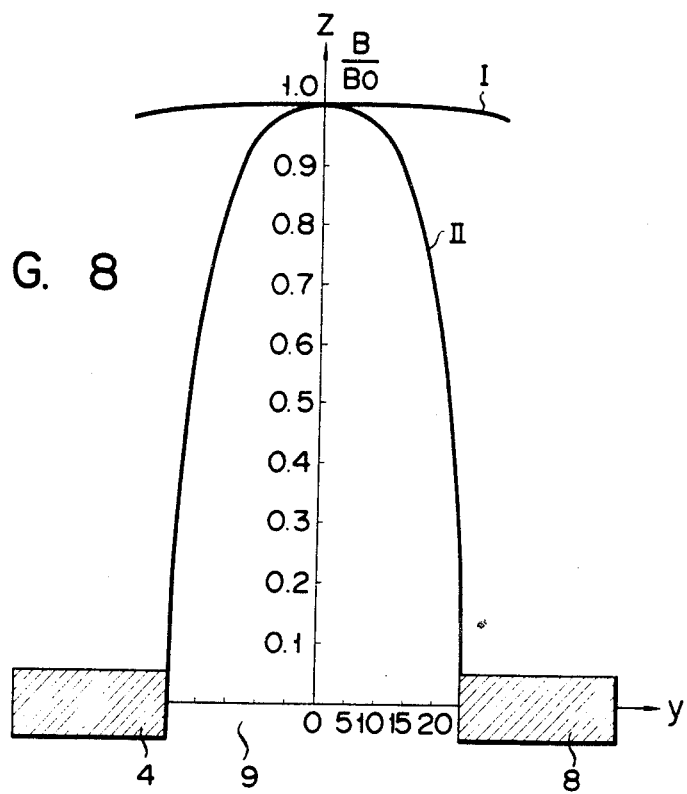

MHD POWER GENERATOR

BACKGROUND OF THE INVENTION

This invention relates to a Faraday type magnetohydrodynamic power generator (abbreviated MHD power generator) for converting the energy of a plasma stream directly into an electrical energy based on the principle of the electromagnetic induction of Faraday, and in particular to a cooled-electrode type MHD power generator.

A generally known conventional MHD power generator of the Faraday type has first and second electrode units 1 and 2 as shown in FIG. 1. The first electrode unit 1 comprises a first segmented electrode 4 made of non-magnetic material and disposed at regular intervals and electrically insulating spacers 6 each disposed between the segmented electrodes to mechanically join the adjacent segments together. Likewise, the second electrode unit 2 comprises a second segmented electrode 8 made of non-magnetic material and disposed at regular intervals and electrically insulating spacers 10 each disposed between the segmented electrodes to mechanically join the adjacent segments together. The first and second electrode units 1 and 2 are such that the corresponding first and second segmented electrodes 4 and 8 face each other. A pair of insulating plates 14, 16 are mounted i.e. one on the upper surface of the electrode unit 1 and the other on the lower surface of the electrode unit 2 to define a passage 9 through which a plasma flows from a known plasma generating source 3. A load 18 is connected between each of the first segmented electrode 4 and the corresponding second segmented electrode 8 through lead wires so that electric current passes through each load 18. In the plasma passage or spacing 9 between the first and second units 1 and 2 a magnetic field as indicated by an arrow 20 is supplied from a magnet. The magnet is an iron core electromagnet, as shown in FIG. 2, which includes a pair of pole pieces 22, 24 between which the plasma spacing may be provided. Alternatively, a pair of air core, or superconducting magnetic coils 26, 28 may be arranged, as shown in FIG. 3, in proximity to the mutually confronting segmented electrodes 4 and 8. Since the segmented electrodes 4 and 8 are in contact with a hot plasma stream, they are cooled by a well-known cooling device 5 in FIG. 1 to permit a continuous operation for a long time period. With X representing the direction of plasma stream as shown in FIG. 1, Y the direction in which a plane including the electrodes 4 and 8 perpendicular to the X direction extends, and Z the direction orthogonal to the plane, a magnetic field will be created, as indicated by an arrow 20, in the Z direction.

In the above-mentioned MHD generator a magnetic field is applied to the passage 9 to create a uniform magnetic density in the passage 9 between the first and second electrode units 1 and 2. When a weakly ionized plasma stream of 2500 to 2800 K flows from the plasma stream generating source in the X-direction i.e., in the direction indicated by an arrow 12, an electric field ($\vec{E} = \vec{V} \times \vec{B}$) is induced in the direction orthogonal to the plasma flow velocity $\vec{V}$ and magnetic flux density vector $\vec{B}$ and an electric current having an electric current density $\vec{J}$ will flow in the direction of the vector $\vec{J}$. As a result, electric current having a predetermined value flows through the load 18, causing an MHD power generation.

With the direction X, Y and Z representing unit vectors $\hat{X}$, $\hat{Y}$ and $\hat{Z}$, $\vec{V} = \hat{X}V$ for stream flux vector (X direction, function of Y)

$\vec{B} = \hat{Z}B$ for (Z direction, function of Y)

$\vec{V} \times \vec{B} = -\hat{Y}VB$ for induced electric field vector ($-Y$ direction, function of Y)

$\vec{J} = \hat{X}J_X + \hat{Y}J_Y$ for current density vector (in the X, Y plane, $J_X$, $J_Y$ are a function of X, Y)

$\vec{E} = \hat{X}E_X + \hat{Y}E_Y$ for electric field vector (in the X, Y plane, $E_X$, $E_Y$ are a function of X, Y)

Based on the view that it is preferred that with the conventional MHD generator the magnetic flux density be distributed as uniformly as possible in the spacing between the electrode units, use has been made of a non-magnetic material, such as copper, stainless steel, or ceramics which imparts no influence to the distribution of the applied magnetic flux density. The conventional MHD generator has its electrodes cooled during a long continuous operation so as to prevent damage and melting of the electrodes 4, 8. There have been arguments that the achievement of the uniform magnetic flux density distribution and cooling of the electrodes cause the power generating capability of the MHD power generator to be reduced to a practically intolerable level. The inventors have already reported in the Sixth International Conference on Magnetohydrodynamic Electrical power Generation that such a problem is solved by applying a theoretically non-uniform magnetic flux density distribution between the electrode units 1 and 2. For further details reference should be made to CONF-750601-pl vol. 1-Open cycle Generators and Systems, "The configuration of Applied Magnetic Induction for Equilibrium MHD Power Generator" pp 399 to 418. At the time of announcement of this paper a means for achieving a predetermined magnetic flux density distribution has not been realized and hence it still has been difficult to improve the power generating capability of the MHD generator.

SUMMARY OF THE INVENTION

It is accordingly the object of this invention to provide an MHD power generator having an improved power generating capability.

According to this invention there is provided an MHD power generator comprising means for generating a weakly ionized plasma stream, a pair of electrodes made of magnetic material and arranged opposite to each other, means for defining between the pair of electrodes a plasma passage through which the plasma stream flows from the plasma stream generating device, means for cooling the pair of electrodes, and a plurality of output lead wires each connected between the mutually facing electrodes so as to take out an electric power generated therebetween.

BRIEF DESCRIPTION OF THE DRAWINGS

FIGS. 4 to 7, each, schematically shows a magnetic field distribution created within the plasma passage of the MHD power generator according to this invention;

FIG. 8 is a graph showing a magnetic field distribution created by an external magnet and ferromagnetic electrode units of the MHD power generator according to this invention;

FIG. 12 is a graph showing the temperature distribution of the plasma stream, on which FIGS. 9 and 10 are based;

FIG. 13 is a graph showing the velocity distribution of the plasma stream on which FIGS. 9 and 10 are based;

DESCRIPTION OF THE PREFERRED EMBODIMENT

An MHD power generator according to one embodiment of this invention will now be explained below by referring to the accompanying drawings.

Figure 1:
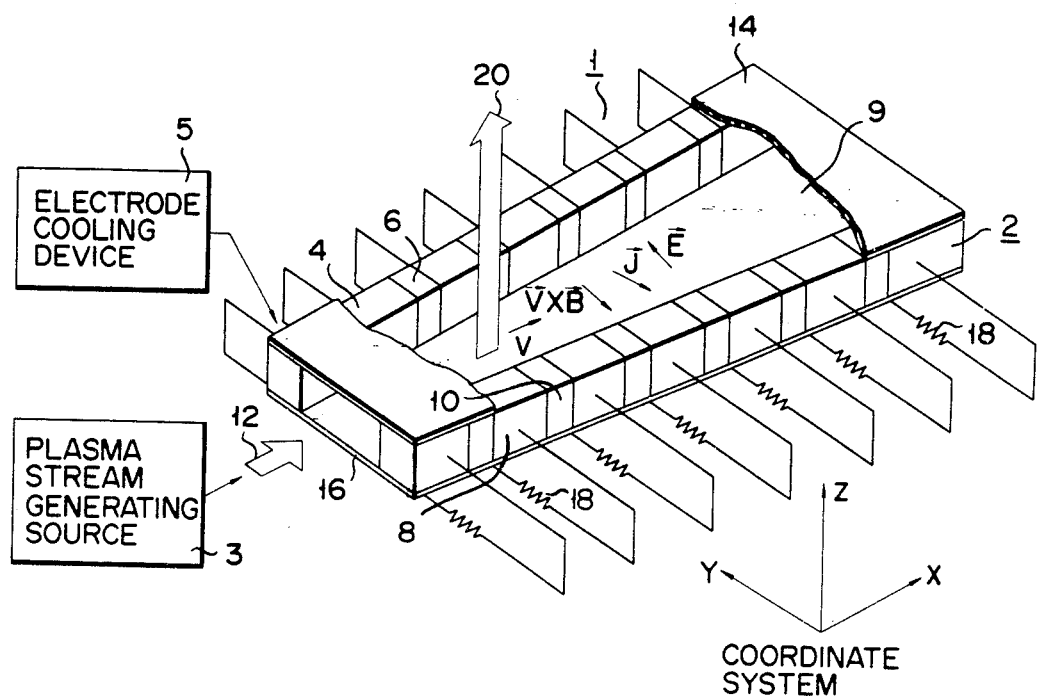
FIG. 1 is a perspective view, partially broken away, schematically showing an MHD power generator of the Faraday type.

An MHD power generator of this invention is constructed fundamentally in the same manner as the conventional MHD power generator shown in FIG. 1. The construction of the MHD power generator has already been explained in the "Background of the Invention" in connection with FIG. 1. Same reference numerals are employed in the following explanation to designate parts or elements corresponding to those shown in FIG. 1.

With the MHD power generator of the conventional type, segmented electrodes 4, 8 are made of a non-magnetic material.

In contrast, the segmented electrodes 4, 8 of this invention are made of a ferromagnetic material such as the soft iron. The segmented electrodes 4, 8 are cooled by a cooling means and from the plasma stream generating source 3 a plasma stream continuously flows for a long period of time through the passage 9 between the electrode units 1 and 2. A magnetic field is applied by the external magnet to the passage 9 and an electrical power is supplied to the load 18.

With the MHD power generator of this invention, since the segmented electrodes 4, 8 are made of ferromagnetic material, a proper magnetic field, as explained in "The Configuration of Applied Magnetic Induction for Equilibrium MHD power Generation" pp 399 to 418, is formed in a plasma passage between first and second electrode units. As a result, it is posssible to obtain an electrical power output having less power losses appearing within the boundary layer regions.

The reason why the MHD power generator of this invention has an improved power generating characteristic will be explained in the following in comparison with the conventional MHD power generator.

Figure 2:
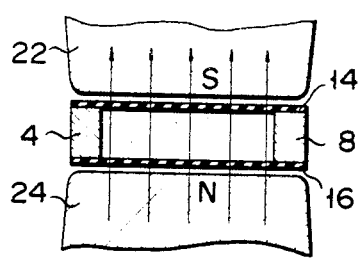
FIG. 2 is a cross-sectional view schematically showing an MHD power generator equipped with an iron core magnet.
Figure 3:
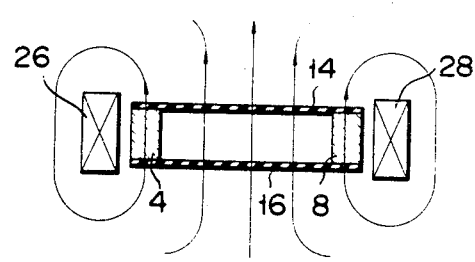
FIG. 3 is a cross-sectional view schematically showing an MHD power generator equipped with an air core, or superconducting magnet coil.

When the segmented electrodes 4, 8 are made of nonmagnetic material, such as stainless steel or copper, as in the case of the conventional MHD power generator, and a magnetic field as shown in FIG. 2 or 3 is created by a magnetic device in the passage 9 between the first and second electrode units, such that it is distributed in the Y direction with a substantially uniform intensity, since the electrodes 4, 8 impart no influence to the magnetic field.

When the segmented electrodes 4, 8 are made of ferromagnetic material and a substantially uniform magnetic field as indicated by solid lines in FIG. 4 is applied from the magnetic device to the passage 9, the electrodes 4, 8 are magnetized by the magnetic field applied. As a result, the segmented electrodes 4, 8 create magnetic fields, as shown in broken lines in FIG. 4, due to the magnetization of the electrodes 4, 8. In the plasma passage 9 between the first and second electrode units the so created magnetic field is opposite in direction to external magnetic fields as indicated in solid arrows. When only the magnetic field as indicated by broken lines is taken out, a distribution as shown in FIG. 5 is obtained. The external magnetic field as created by an iron core magnet (FIG. 2) or an air core magnet (FIG. 3) is substantially uniformly distributed as shown in FIG. 6. In consequence, the magnetic field acting upon the flow of plasma will become a non-uniform distribution in which the intensity of the magnetic field is rapidly attenuated over the surfaces of the electrodes 4, 8 as shown in FIG. 7 in which a synthesized magnetic field distribution (the magnetic field of FIG. 5 and the magnetic field of FIG. 6) is shown.

FIG. 8 is a graph showing a magnetic field distribution actually measured in the plasma passage 9. In FIG. 8, the curve I shows a ratio B/Bo of a magnetic flux density as measured in the plasma passage 9 of the conventional MHD power generator using a stainless steel electrode and the curve II a ratio B/Bo of the magnetic flux density as measured in the plasma passage 9 of the MHD power generator according to this invention. The abscissa indicates a position between the segmented electrodes 4 and 8 with a point 0 as a center and the ordinate the ratio B/Bo between the magnetic flux density B at each position and the magnetic flux density Bo at the center ($Y=0$) between the segmented electrodes. In the normal MHD power generation, the magnetic density Bo is within a range of 1.5 Tesla$\leq$Bo$\leq$5 Tesla (Tesla = 10000 Gauss). As evident from the graph of FIG. 8, when iron (magnetic material) is used as the electrode the magnetic flux density in the central region is still uniform. However, the magnetic flux density is rapidly decreased toward the surfaces of the electrodes 4, 8. This means that the explanation made in connection with FIGS. 4 to 7 agrees with an actual value. As an electrode material for creating a magnetic density distribution it is more preferable to use a material whose maximum specific magnetic permeability $\mu$ max is greater. In one example, the maximum specific permeability $\mu$ max is more than 1000. By the maximum specific permeability $\mu$ max it is meant the saturated value (i.e. the maximum value) of the specific permeability $\mu(\vec{B})$ which varies with an increasing external magnetic field. A pure iron ($\mu$ max: several thousands), pure iron ($\mu$ max: $34 \times 10^4$) hydrogenated at high temperature in vacuum, and nickel ($\mu$ max: 1120), as well as an iron-, nickel- and cobalt-based alloy, can for example be listed as a ferromagnetic material whose maximum specific permeability $\mu$ max is more than 1000.

Figure 10:
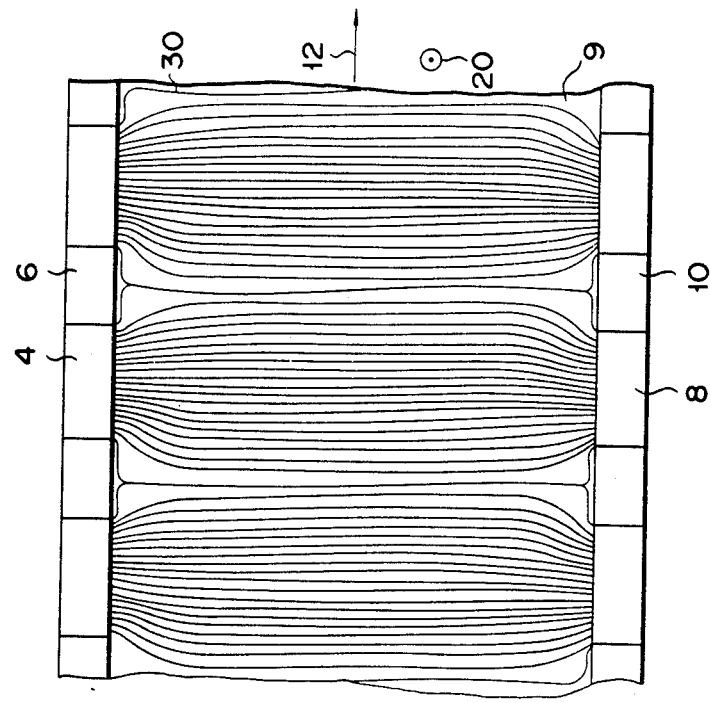
FIG. 10 shows an illustration of electric current lines, based on calculations, which is present in the plasma passage of an MHD power generator according to this invention.
Figure 9:
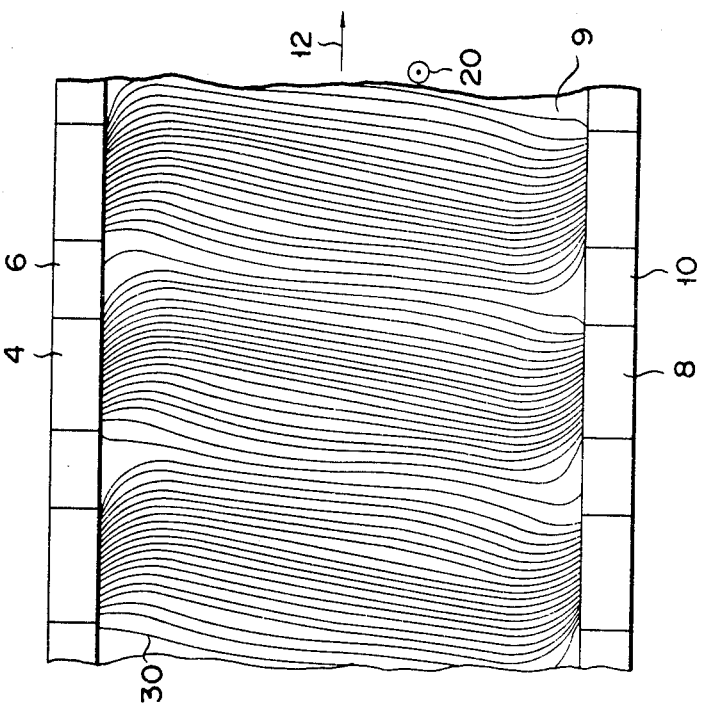
FIG. 9 shows an illustration of electric current lines, based on calculations, which is present in the plasma passage of a conventional MHD power generator.

FIG. 9 shows an electric current distribution, as calculated on the X, Y plane, in the plasma passage 9 between the segmented electrodes 4, 8 (three sets of electrodes are shown) of the conventional MHD power generator when stainless steel (non-magnetic material) is used as an electrode material. FIG. 10 shows an electric current distribution, calculated on the X, Y plane, in the plasma passage 9 (three sets of electrodes 4, 8 are shown) of the MHD power generator according to this invention. In FIGS. 9 and 10 electric current flows from the anode 4 to the cathode 8 and the interval of current lines 30 is 0.05 Ampere/m.

A stream of plasma flows from left to right across a magnetic field directed from the reverse surface to the outer surface of a paper (the direction is shown by a mark 20). The temperature of the plasma stream is 2500 K at the central region and the flow velocity 550 m/sec; the strength of the magnetic field is 6500 Gauss and the pressure 1 atm; and Hall's coefficient given as the product of the mobility of plasma electron, $\gamma$, and the strength of magnetic field, B, is $\gamma B = 2.0$ at the cenetral region. The current density is calculated based on these values and the arrangements of FIGS. 9 and 10 are thus obtained, by solving generalized Ohm's law and Maxwell's equations simultaneously.

When in general a weakly ionized plasma with temperatures of 2500 to 2800 K flows in the plasma passage between two electrode units an abrupt non-uniformity in temperature, as well as in flow velocity, of the plasma stream occurs in the Y-direction i.e., from the main stream zone toward the surfaces of the electrodes.

Figure 11:
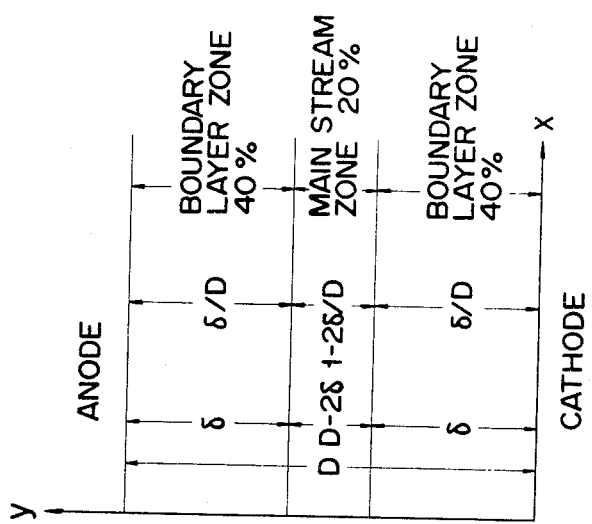
FIG. 11 shows a relation of the width of boundary layer zones to the width of a main stream zone created in the plasma passage, on which the graphs of FIGS. 9 and 10 are based.

FIGS. 9 and 10 are drawn on the assumption that the main stream zone over which the flow velocity and temperature of plasma stream are substantially constant has a width $D-2\delta$, as shown in FIG. 11, corresponding to 20% of a distance between the segmented electrodes 4 and 8 and that the boundary layer region has a width $\delta$, as shown in FIG. 11, corresponding to 40% of a width D between the segmented electrodes 4 and 8. In this case, the temperature $T_O$ and flow velocity $V_O$ in the main stream zone of the plasma passage is 2500 K and 550 m/sec., respectively. The plasma temperature $T_W$ and velocity $V_W$ at the surface of the electrodes 4, 8 are 1300 K and 0 m/sec., respectively. As already set out, the plasma passage 9 of the conventional MHD power generator shown in FIG. 9 provides a substantially uniform magnetic field Bo and the plasma passage 9 of the MHD power generator shown in FIG. 10 provides a nonuniform magnetic field B. The temperature distribution T(Y) of the boundary layer is assumed to be given by:

$$T(Y) = T_W + (T_O - T_W)(Y/\delta)^{1/10} \qquad (1)$$

for the boundary layer zone at the cathode side.

$$T(Y) = T_W + (T_O - T_W)(D - Y/\delta)^{1/10} \qquad (2)$$

for the boundary layer zone at the anode side.

Figure 12:
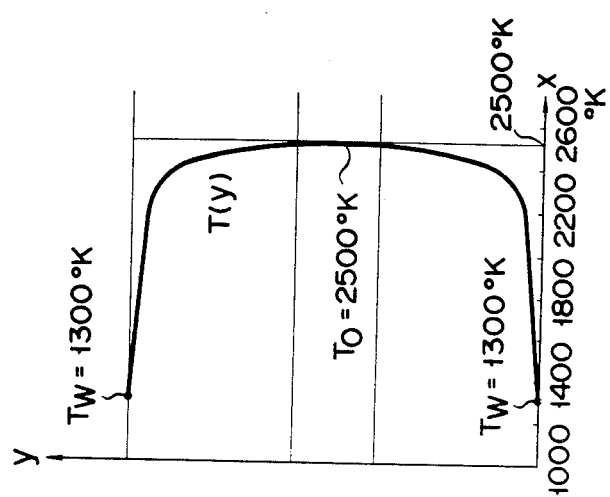

FIG. 12 shows a temperature distribution of the plasma passage 9 as described above based on these Equations.

The velocity of the plasma stream in the boundary layer zone is assumed to be given by:

$$V(Y) = V_O(Y/\delta)^{1/5} \qquad (3)$$

for the boundary layer zone at the cathode side.

$$V(Y) = V_O(D - Y/\delta)^{1/5} \qquad (4)$$

for the boundary layer zone at the anode side.

Figure 13:
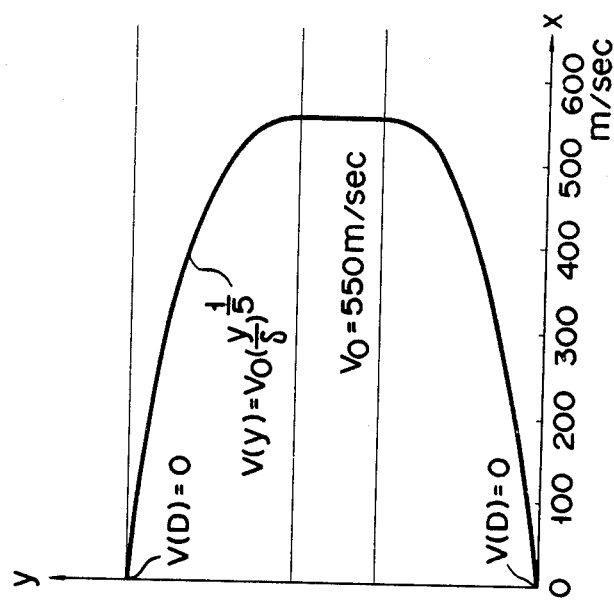

FIG. 13 shows a velocity distribution of the plasma passage 9 as drawn based on these Equations (3) and (4). It is confirmed that the graph of FIG. 13 is substantially in agreement with test results.

The electrical conductivity $\sigma$ of the plasma stream is given by following Saha's relationship (5):

$$\sigma = \text{const} \cdot T^{\frac{3}{4}} P^{-\frac{1}{4}} \text{EXP}(-\phi W/2KT) \qquad (5)$$

T: the temperature of plasma stream
P: the pressure of plasma stream
K: Boltzmanns's constant
$\phi_W$: ionization potential energy.

In the temperature range of the plasma used in an MHD power generation the value of the exponential term $\text{EXP}(-\phi W/2KT)$ shows a very strong dependence on the temperature T. Where the temperature T varies in the boundary layer zone the electrical conductivity $\sigma$ varies more rapidly and on the surface of the segmented electrode the conductivity $\sigma$ becomes very low. According to calculation, the conductivity $\sigma_O$ is about 50 mho/m in the main stream zone (central zone) and the conductivity $\sigma_W$ is about $10^{-3}$ mho/m at Y=0 when $T_W = 1300$ K. Thus, an abrupt variation of the electrical conductivity $\sigma$ is noted. In addition, since for the stainless steel electrode of FIG. 9 the above-mentioned magnetic field is applied uniformly over the whole region of Y the current $\vec{J}$ is forced to be bent in the X direction under the action of the Lorentz force $(\vec{J} \times \vec{B})$, thereby providing a strong Hall effect. The force applied due to Hall's effect is in proportion to a product $\gamma B$ of the mobility $\gamma$ and magnetic flux density B. As a result, the electric current is spatially nonuniformly distributed as shown in FIG. 9. This leads to an increase in the value of the internal resistance and a decrease in the power output generated, which may provide a main cause for lowering the performance of the generator.

As an ideal MHD power generator, suppose that the electric current flows from the anode toward the cathode to provide a uniform distribution. Further suppose that the internal resistance is Rio with uniform temperature and velocity and with no boundary layer zone. In the case of non-magnetic material such as stainless steel electrode under the uniform magnetic field as shown in FIG. 9, the internal resistance can be expressed as follows:

$$Ri = Rio$$
$$(<\sigma> \times <1/\sigma> + <\sigma> \times <\delta^2 B^2/\sigma> - <\delta B>^2) \qquad (6)$$

where
$<\sigma>$: the spatially averaged value of the electrical conductivity $\sigma$ in which the boundary layer effect is included.

$<\gamma>$: the spatially averaged value of the Hall efficient as defined by the mobility $\gamma$ and magnetic flux density B.

$<1/\sigma>$: the spatially averaged value of the specific resistance of the plasma.

As evident from the above Equation the internal resistance Ri of the conventional MHD power generator with cooled electrodes to which a uniform magnetic flux density is applied is increased by a factor of $$<\sigma> \times <1/\sigma> + <\sigma> \times <\gamma^2 B^2/\sigma> - <\mu B>^2 \approx (5 \sim 10) \text{Rio} \quad (7)$$

as compared with the internal resistance Rio of an ideal MHD power generator of which the electrode is not cooled and which involves no Hall effect. Here the output of the conventional MHD power generator is reduced by a factor of 5 to 10. In consequence, there is a demand for the development of an MHD power generator with as low an internal resistance as possible. This problem has been surmounted by the inventors. That is, according to this invention a non-uniform magnetic field as shown in the above-mentioned paper is created in the plasma passage and the magnetic flux density B(Y) in each position of the Y direction is selected to have a value given by:

$$B(Y) = C(\sigma(Y)/\gamma(Y) C = Bo \, \gamma_O/\sigma_O \quad (8)$$

where $\sigma(Y)$: the electrical conductivity of plasma stream on the Y coordinate $\gamma(Y)$: the mobility on the Y coordinate Bo: the magnetic flux density of the main stream zone $\gamma_O$: the mobility of the main stream zone $\sigma_O$: the electrical conductivity of the main stream zone The magnetic field distribution which should satisfy the condition: $d/dY(\delta B/\sigma) = 0$ can be realized by utilizing a ferromagnetic material such as the soft iron as an electrode. Such magnetic field distribution is actually measured as shown in FIG. 8. The fact that under this magnetic field distribution the electric current distributes uniformly is confirmed, on calculation, as shown in FIG. 10.

In the case where $B = C \cdot \sigma/\gamma$ the internal resistance, upon substitution into Equation (8), becomes $Ri = Rio < \sigma < X > 1/\sigma >$ which, it is easily ascertained, approximates to that of the ideal MHD power generator.

Figure 14:
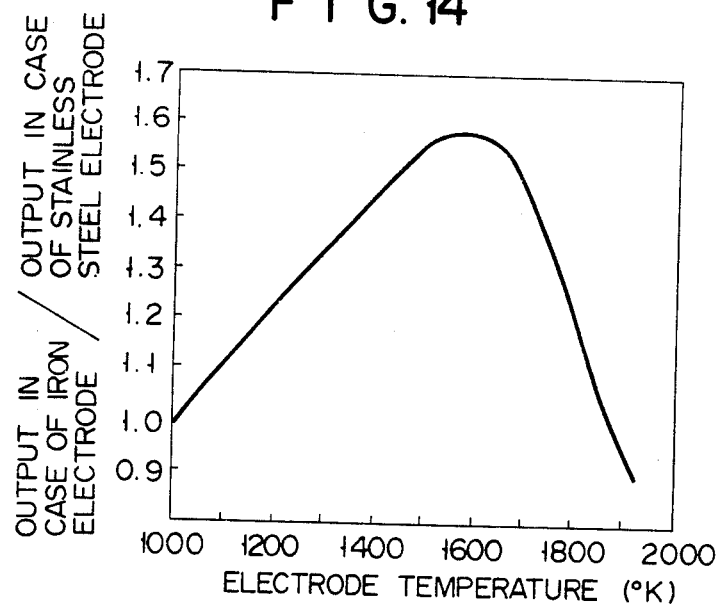
FIG. 14 is a graph showing a relation of the output of the MHD power generator, as opposed to that of the conventional MHD power generator, to the surface temperature of the electrodes in contact with the plasma stream.
Figure 15:
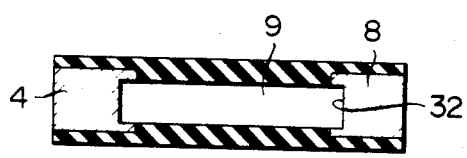
FIGS. 15 and 16 are longitudinal cross-sectional views each showing the MHD power generator of this invention.

FIG. 14 shows an output power ratio between the MHD power generator utilizing the conventional non-magnetic electrodes (stainless steel) and the inventors' MHD power generator utilizing the ferromagnetic electrodes (iron), the electrodes of both generators being water-cooled with the electrode surface temperature varying in the range $1000 \, K \leq T_W \leq 2000 \, K$.

In FIG. 14, the plasma temperature of the main stream zone, $T_O$ is 2500 K; the Hall Coefficient of the main stream zone, $\beta_O$, is 2.0; and the ratio of the boundary layer thickness/interelectrode spacing, $\sigma/D$, is 0.4. As is evident from this graph, the surface temperature of the electrodes 4, 8 is preferably in a range of 1200–1800 K and more preferably at about 1600 K. The segmented electrodes 4, 8 in the electrode units 1, 2 (magnetic material) may be of a mere rectangular configuration shown in FIG. 1, but more preferably they may be configured such that recesses 32 are formed at the mutually facing surfaces of the segmented electrodes 4, 8 with a pair of projections i.e. one at each side of the recess 32. In the latter case, the magnetic flux density over the surface of the segmented electrodes 4, 8 i.e. the surface of the recess 32 of the electrodes 4, 8 becomes very small and in consequence the magnetic flux density in the plasma passage is more abruptly attenuated at the segmented electrode surfaces.

Figure 16:
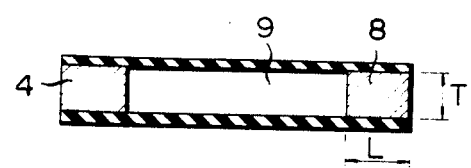

In case of the segmented electrode shown in FIG. 16 no effective result is obtained if the width L of the electrode is made too narrow. If the thickness of the segmented electrode, T, is too great, the advantage is lessened because the magnetic flux density in the central region decreases ineffectively in this case. The measurement shown in FIG. 8 has been carried out with an electrode pair having the ratio; L:T=3:1. The depth of the segmented electrode as measured in the X direction is equal to the width of the electrode, T. In order for a magnetic field created by the magnetization of the electrode to have such a distribution that it has as great a negative value as possible in the neighborhood of the surface of the electrode (in the negative direction to an external magnetic field) with a substantially zero value at the central zone, it will be necessary to clarify an optimal electrode configuration based on a more detailed calculation.

When, as mentioned in this invention, the electrode of the MHD power generator according to this invention is made of a ferromagnetic material such as iron, there is a great danger if the electrode is susceptible to oxidation, since a hot plasma flows between the electrodes. In actual practice, it is necessary that a coating be applied to that electrode surface in contact with the plasma stream to prevent, for example, oxidation.

A ceramic, for example, is listed as a coating material. A zirconium-based heat-resistant ceramic can be considered as a preferable material, since it has a sufficient electric conductivity at 1800 to 2000 K.

In the above-mentioned embodiment the segmented electrodes 4, 8 are made of ferromagnetic material. With ferromagnetic material, in general, the magnetization becomes zero when the Curie point is exceeded. It is therefore believed difficult to create a proper magnetic field in the plasma passage. From this viewpoint, a cooling passage, i.e. a cooling path, in the segmented electrodes 4, 8 is provided preferably in proximity to the plasma stream contact surface of the segmented electrodes 4, 8. It is preferred that the segmented electrodes 4, 8 be maintained at substantially normal temperature by a cooling medium which flows through a cooling path.

Figure 17:
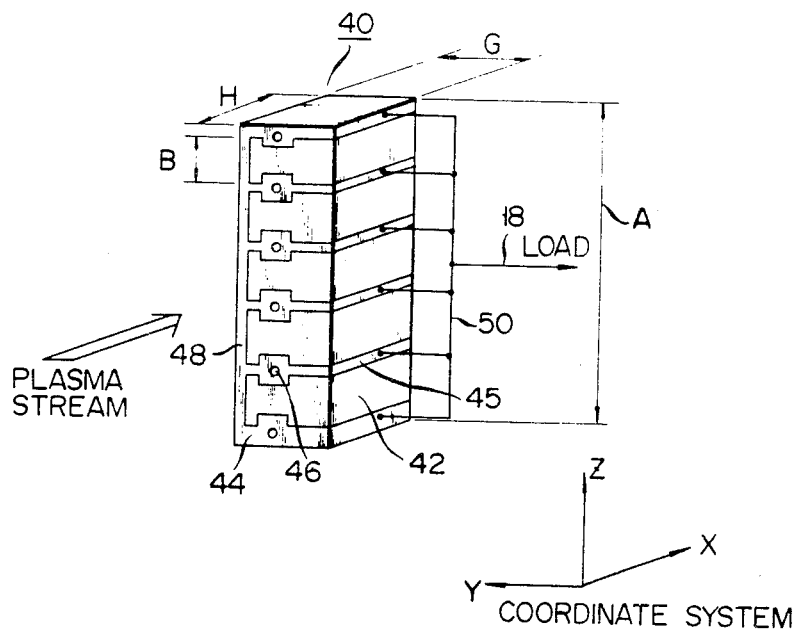
FIG. 17 is a perspective view showing an MHD power generator according to another embodiment of this invention.

The segmented electrode 40 shown in FIG. 17 is a combined structure of a frame 44 made of copper and ferromagnetic blocks 42 which are replaced by the segmented electrodes 4, 8 of the above-mentioned embodiment. In the electrode 40, a plurality of ferromagnetic blocks 42 are superposed and the respective blocks 42 are partitioned by each of separate plates 45 of a frame 44 made of copper. A cooling path 46 is provided in the separate plate 44. A cooling medium from an electrode cooling device 5 flows through the cooling path 46 in the separate plate. A frame member 48 is disposed at that surface of the electrode which is contacted with a plasma stream. Lead wires 50 are connected to the separate plate 44 of the frame 40 and to a lead 18. The frame 44 is made of copper which is good in heat conductivity and electric conductivity, and since the frame 40 is cooled the ferromagnetic block 42 can be easily cooled at a temperature near to room temperature. The above-mentioned segmented electrode 40 can be designed to meet the following requirements.

It is required that the segmented electrode 40 be located in proximity to the adjacent other segmented electrode. In this case it is preferable to dispose a spacer 10 of several centimeters in width. This is done to prevent the magnetic field from varying in the X direction (FIG. 17) in which the plasma stream flows. It is required that the width of the segment electrode as seen in the X and Z directions be more than several centimeters in order to create an effective counter magnetic field. If the thickness of the ferromagnetic block of the segmented electrode as seen in the Z direction (FIG. 17) is too great, no effective counter magnetic field is created up to the center zone of the plasma stream. This prevents effective power generation. From this viewpoint it is believed preferable that the thickness of the ferromagnetic block be about several centimeters.

In an actual example, the height A of the segmented electrode 40 is 30 to 50 cm, the width G of the segmented electrode as seen in the Y direction is 5 to 10 cm, and the width H of the segmented electrode as seen in the X direction is 10 to 20 cm. The height B of the ferromagnetic block 42 is 3 to 5 cm. Several tens of pairs of segmented electrodes 40 are arranged in the Y direction with a spacer of several centimeters disposed between the adjacent segmented electrodes 40.

According to this invention the segmented electrodes are made of ferromagnetic material and it is possible to create a magnetic flux distribution B(Y) being nearly proportional to $\sigma(Y)/\gamma(Y)$ under the action of magnetization of the electrode itself placed in the external uniform magnetic field. In consequence, the output performance of the MHD power generator can be improved very significantly ranging from 100–200 percent.

In the above-mentioned embodiment a plurality of segmented electrodes are arranged in two arrays with a spacer disposed between the adjacent segment electrodes in each array so that a pair of electrode units are obtained. It will be evident, however, that the concept of utilizing the non-uniform magnetic field distribution of this invention is also applicable in the case of the well-known single pair of continuous electrodes which define the plasma passage.

It will also be evident, that the MHD power generator of this invention may include a pair of electrode units with a few spacers, which constitutes a pair of continuous, as opposed to segmented, electrodes made of ferromagnetic material.

What we claim is:

1. An MHD power generator comprising means for generating a weakly ionized plasma stream, a pair of electrodes made of magnetic material and arranged opposite to each other, means for defining a plasma passage between the pair of electrodes through which the plasma stream flows from the plasma stream generating means, means for cooling the pair of electrodes, and a plurality of output lines each connected to the mutually facing electrodes so as to take out an electric power generated therebetween.

2. An MHD power generator according to claim 1, in which said pair of electrodes are made of ferromagnetic materials.

3. An MHD power generator according to claim 1, in which said pair of electrodes each comprises a plurality of segmented electrodes with an insulating material disposed between the next adjacent segmented electrodes.

4. An MHD power generator according to claim 1, in which said pair of electrodes are made of ferromagnetic materials and said cooling means is adapted to permit the temperature of those surfaces of the electrodes which are in contact with the plasma stream to be maintained at 1200–1800 K.

5. An MHD power generator according to claim 1, in which said pair of electrodes each comprises a plurality of segmented electrodes with an insulating material disposed between the next adjacent segmented electrodes, the segmented electrodes each having a recess at that surface in contact with the plasma stream.

6. An MHD power generator according to claim 2, in which said ferromagnetic material has a maximum specific magnetic permeability of more than 1000.

7. An MHD power generator according to claim 1, in which that surface of the electrodes which is in contact with the plasma stream is coated with a coating material.

8. An MHD power generator according to claim 7, in which said coating material is a ceramic.

9. An MHD power generator comprising means for generating a weakly ionized plasma stream, a pair of electrodes arranged opposite to each other and comprising a block made of magnetic material and frame means made of an electrically and thermally conductive material and adapted to cover the block, a cooling medium passage provided in said frame means, means for defining a plasma passage between the pair of electrodes through which the plasma stream flows from the plasma stream generating means, means for supplying a cooling medium into the cooling medium passage to cool the electrodes, and a plurality of output lines each connected to the mutually facing electrodes so as to take out an electric power generated therebetween.

10. An MHD power generator according to claim 9, in which said pair of electrodes are made of ferromagnetic material.

11. An MHD power generator according to claim 9, in which said pair of electrodes are each constituted by a plurality of segmented electrodes connected so that an insulator is disposed between the adjacent segmented electrodes.

12. An MHD power generator according to claim 9, in which said pair of electrodes are made of ferromagnetic material and said cooling medium supply means serves to permit the temperature of those contact surfaces of the electrodes which are in contact with the plasma stream to be maintained within a range of 1200 to 1800 K.

13. An MHD power generator according to claim 9, in which said ferromagnetic material has a maximum specific magnetic permeability $\mu$ max of more than 1000.

14. An MHD power generator according to claim 9, in which those surfaces of the electrodes which are in contact with the plasma stream are coated with coating material.

15. An MHD power generator according to claim 15, in which said coating material is a ceramic.

* * * * *